United States Patent
Qiu et al.

(10) Patent No.: US 10,923,817 B2
(45) Date of Patent: Feb. 16, 2021

(54) ANTENNA SYSTEM AND MOBILE TERMINAL

(71) Applicant: AAC Technologies Pte. Ltd., Singapore (SG)

(72) Inventors: Xiaojun Qiu, Shenzhen (CN); Bo Zhu, Shenzhen (CN)

(73) Assignee: AAC Technologies Pte. Ltd., Singapore (SG)

(*) Notice: Subject to any disclaimer, the term of this patent is extended or adjusted under 35 U.S.C. 154(b) by 0 days.

(21) Appl. No.: 16/703,901

(22) Filed: Dec. 5, 2019

(65) Prior Publication Data

US 2020/0212571 A1   Jul. 2, 2020

(30) Foreign Application Priority Data

Dec. 29, 2018   (CN) .......................... 20181165389.2

(51) Int. Cl.
*H01Q 5/335* (2015.01)
*H01Q 1/50* (2006.01)
*H01Q 5/50* (2015.01)
*H04B 1/00* (2006.01)
*H01Q 23/00* (2006.01)
*H04M 1/02* (2006.01)

(52) U.S. Cl.
CPC ............ *H01Q 5/335* (2015.01); *H01Q 1/50* (2013.01); *H01Q 5/50* (2015.01); *H01Q 23/00* (2013.01); *H04B 1/006* (2013.01); *H04M 1/026* (2013.01)

(58) Field of Classification Search
CPC ........ H01Q 5/00–55; H01Q 1/50; H01Q 5/50; H04B 1/005–0096
See application file for complete search history.

(56) References Cited

U.S. PATENT DOCUMENTS

| | | | | |
|---|---|---|---|---|
| 9,024,823 B2 * | 5/2015 | Bevelacqua | ............. | H01Q 9/42 343/702 |
| 9,065,175 B2 * | 6/2015 | Corbin | ................. | H05K 1/0215 |
| 9,337,539 B1 * | 5/2016 | Ananthanarayanan | | ...................... H01O 5/335 |
| 9,350,069 B2 * | 5/2016 | Pascolini | ............... | H01Q 1/243 |
| 10,158,384 B1 * | 12/2018 | Yarga | ................... | H01Q 13/103 |

(Continued)

FOREIGN PATENT DOCUMENTS

| CN | 106972254 A | * | 7/2017 | ............. H01Q 5/335 |
|---|---|---|---|---|
| CN | 108199132 A | * | 6/2018 | |
| JP | 2019009760 A | * | 1/2019 | ............... H01Q 9/42 |

*Primary Examiner* — Gennadiy Tsvey
(74) *Attorney, Agent, or Firm* — W&G Law Group LLP

(57) ABSTRACT

An antenna system and a mobile terminal are provided. The antenna system includes a front frame rib connecting a system ground with a first short-axis frame, a slit provided on a first long-axis frame, a radio frequency front end area provided in system ground, and first and second frame-joint points each connecting radio frequency front end area with a metal frame. The first and second frame-joint points are located between front frame rib and slit. The radio frequency front end area includes a feeding point, a matching circuit, an impedance tuning circuit and a switching circuit. The impedance tuning circuit and the switching circuit are adjusted to switch an operating state of antenna system in such a manner that the antenna system operates in different frequency bands. The antenna system includes one operating state in which the antenna system operates in a frequency band ranging from 1710 MHz to 2700 MHz.

18 Claims, 6 Drawing Sheets

(56) References Cited

U.S. PATENT DOCUMENTS

| | | | |
|---|---|---|---|
| 10,530,043 B2* | 1/2020 | Liu | H04M 1/026 |
| 10,601,112 B2* | 3/2020 | Zhang | H01Q 5/50 |
| 2008/0316121 A1* | 12/2008 | Hobson | H01Q 1/24 |
| | | | 343/702 |
| 2012/0009983 A1* | 1/2012 | Mow | H04B 1/40 |
| | | | 455/575.7 |
| 2012/0176278 A1* | 7/2012 | Merz | H01Q 1/48 |
| | | | 343/702 |
| 2012/0176754 A1* | 7/2012 | Merz | H04M 1/026 |
| | | | 361/751 |
| 2012/0178382 A1* | 7/2012 | Merz | H01Q 13/103 |
| | | | 455/73 |
| 2013/0201067 A1* | 8/2013 | Hu | H01Q 9/0421 |
| | | | 343/745 |
| 2013/0257659 A1* | 10/2013 | Darnell | H05K 1/181 |
| | | | 343/702 |
| 2013/0342411 A1* | 12/2013 | Jung | H01Q 5/307 |
| | | | 343/767 |
| 2014/0078008 A1* | 3/2014 | Kang | H01Q 7/00 |
| | | | 343/702 |
| 2015/0280323 A1* | 10/2015 | Liu | H01Q 5/335 |
| | | | 343/745 |
| 2015/0340757 A1* | 11/2015 | Rho | H01Q 1/243 |
| | | | 343/702 |
| 2016/0164167 A1* | 6/2016 | Choi | H01Q 9/42 |
| | | | 343/702 |
| 2016/0164168 A1* | 6/2016 | Choi | H01Q 1/243 |
| | | | 343/702 |
| 2016/0336644 A1* | 11/2016 | Lee | H01Q 5/357 |
| 2017/0040668 A1* | 2/2017 | Ayala Vazquez | H01Q 5/378 |
| 2017/0048363 A1* | 2/2017 | Lee | H04B 1/3833 |
| 2017/0054196 A1* | 2/2017 | Hu | H01Q 5/357 |
| 2017/0170562 A1* | 6/2017 | Lee | H01Q 7/00 |
| 2018/0026335 A1* | 1/2018 | Lee | H01Q 13/18 |
| | | | 343/702 |
| 2018/0034135 A1* | 2/2018 | Kwak | H01Q 5/35 |
| 2018/0069297 A1* | 3/2018 | Jin | H01Q 9/42 |
| 2018/0076507 A1* | 3/2018 | Heo | H01Q 1/243 |
| 2018/0083343 A1* | 3/2018 | Choon | H01Q 1/243 |
| 2018/0090817 A1* | 3/2018 | Rajagopalan | H01Q 5/378 |
| 2018/0183137 A1* | 6/2018 | Tsai | H01Q 5/335 |
| 2018/0183138 A1* | 6/2018 | Cheng | H04M 1/0277 |
| 2018/0191060 A1* | 7/2018 | Wu | H04M 1/0283 |
| 2018/0241430 A1* | 8/2018 | Youn | G06F 1/1656 |
| 2018/0248250 A1* | 8/2018 | Hsu | H01Q 5/378 |
| 2018/0261921 A1* | 9/2018 | Ha | H01Q 5/35 |
| 2018/0375193 A1* | 12/2018 | Zhang | H01Q 9/42 |
| 2019/0027830 A1* | 1/2019 | Wang | H01Q 9/42 |
| 2019/0067821 A1* | 2/2019 | Kim | H01Q 7/00 |
| 2019/0081396 A1* | 3/2019 | Zhou | H01Q 5/328 |
| 2019/0181564 A1* | 6/2019 | Kwon | H01Q 1/16 |
| 2019/0214714 A1* | 7/2019 | Chen | H01Q 21/28 |
| 2019/0214721 A1* | 7/2019 | Hu | H01Q 1/2266 |

* cited by examiner

ANTENNA SYSTEM AND MOBILE TERMINAL

TECHNICAL FIELD

The present disclosure relates to the field of communications, and in particular, to an antenna system and a mobile terminal.

BACKGROUND

Since a slot antenna is small in size and light in weight and it is easy to realize a conformal design with a device, the slot antenna is widely used in mobile phones. With the continuous development of handheld communication products, more and more new technologies and processes are applied to research and development of electronic devices. Due to improvement of texture requirements on a whole machine, a screen-to-body ratio of a screen is getting larger and larger.

However, inventors have found that at least following problems exist in the related art. Many metal slot antennas are designed in such a way that a feeding point is series connected to an adjustable capacitor and a place switch. However, while employing a full screen, an antenna has a small clearance zone, an insufficient impedance bandwidth of the antenna, and an antenna Smith circle difficult to match, so that in a design process, it is often impossible to achieve good performances in low-frequency, intermediate-frequency and medium-and-high frequency of the antenna simultaneously.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

The series numbers for components herein, such as "first", "second", etc., are only used to distinguish described objects and do not have any order or technical meaning. The terms "connect" or "couple" as used in the present disclosure include both direct and indirect connections (coupling) unless otherwise specified.

Figure 1:
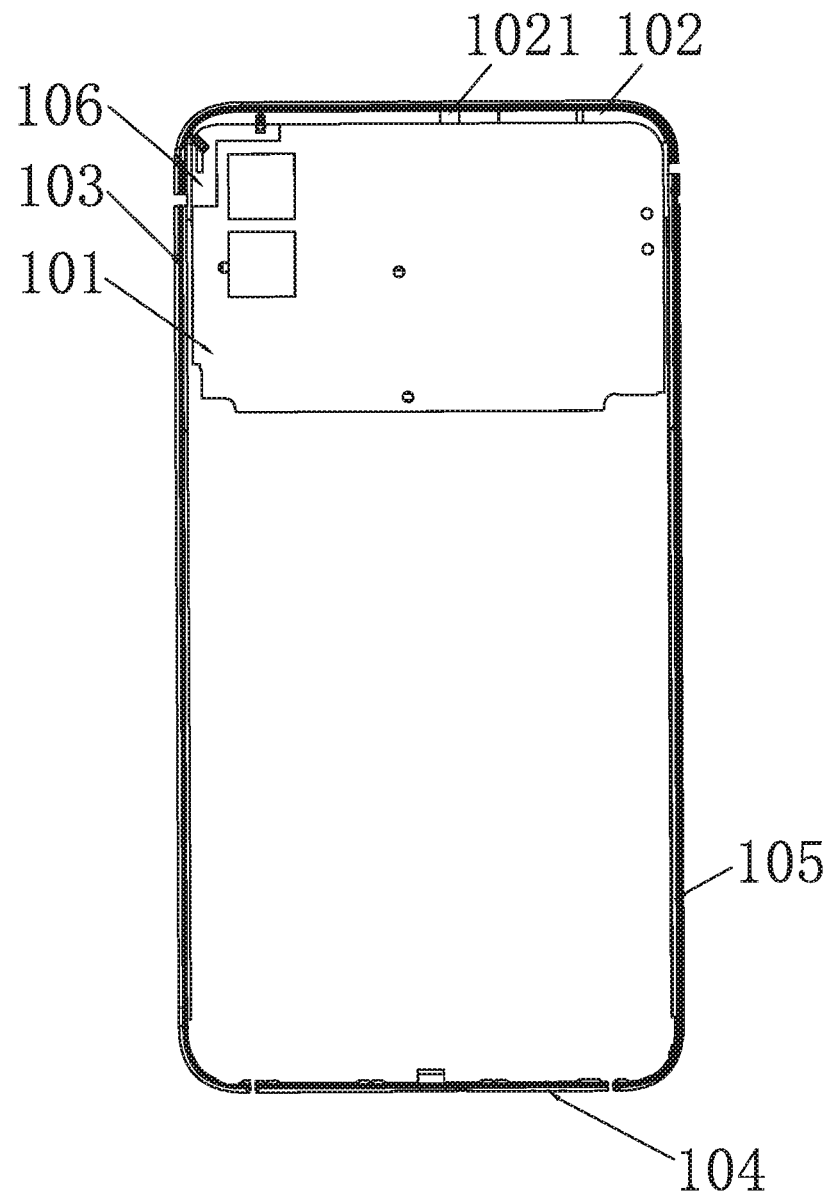
FIG. 1 is a schematic diagram of a mobile terminal according to a first embodiment.
Figure 2:
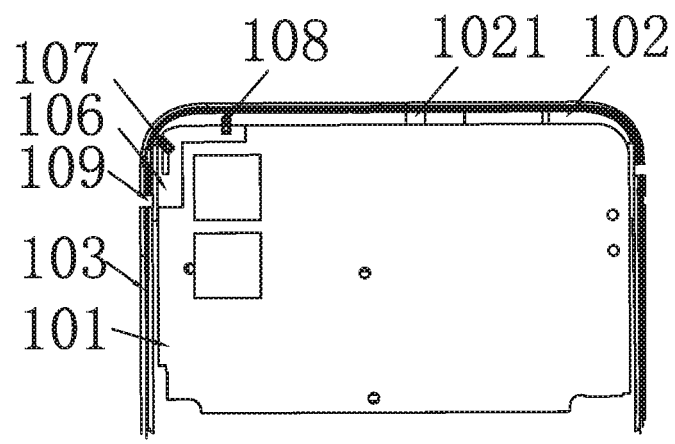
FIG. 2 is a schematic diagram of an antenna system according to a first embodiment.

A first embodiment of the present disclosure relates to an antenna system, which is applied to a mobile terminal. The mobile terminal includes a metal frame and a system ground 101 received in the metal frame. The metal frame includes a first short-axis frame 102, a first long-axis frame 103, a second short-axis frame 104, and a second long-axis frame 105 that are sequentially connected end to end. In a direction along the first long-axis frame 103, a distance between the system ground 101 and the first short-axis frame 102 is not larger than 1.5 mm, and a distance between the system ground 101 and the first long-axis frame 103 is not larger than 1 mm. The antenna system includes: a front frame rib 1021 connecting the system ground 101 with the first short-axis frame 102, a slit 109 provided on the first long-axis frame, a radio frequency front end area 106 provided in the system ground 101, and a first frame-joint point 107 and a second frame-joint point 108. The first frame-joint point 107 and the second frame-joint point 108 each connect the radio frequency front end area 106 with the metal frame. The first frame-joint point 107 and the second frame-joint point 108 each are located between the front frame rib 1021 and the slit 109. The radio frequency front end area 106 is provided with a feeding point (not shown in FIG. 2), a matching circuit (not shown in FIG. 2), an impedance tuning circuit (not shown in FIG. 2), and a switching circuit (not shown in FIG. 2). The feeding point is electrically connected to the first frame-joint point 107 through the matching circuit and the impedance tuning circuit that are connected in series. The second frame-joint point 108 is electrically connected to the system ground 101 through the switching circuit. the impedance tuning circuit and the switching circuit are adjusted to switch an operating state of the antenna system in such a manner that the antenna system operates in different frequency bands. The antenna system includes an operating state in which the antenna system operates in a frequency band ranging from 1710 MHz to 2700 MHz.

Figure 3:
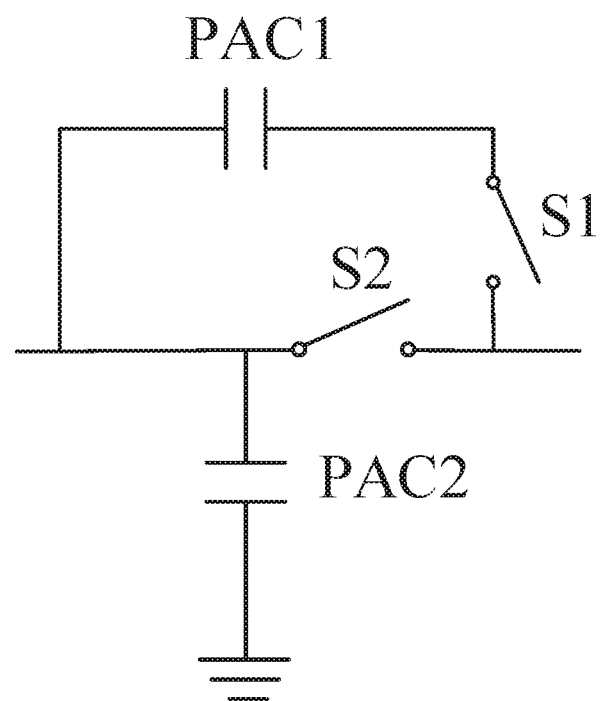
FIG. 3 is a circuit diagram of an impedance tuning circuit of an antenna system according to a first embodiment.

In one example, the impedance tuning circuit is as shown in FIG. 3, and it includes a first switch S1, a second switch S2, a first tuning capacitor PAC1, and a second tuning capacitor PAC2. A first end of the first tuning capacitor PAC1, a first end of the second switch S2, and a first end of the second tuning capacitor PAC2 are connected to each other. A node connected to the first end of the first tuning capacitor PAC1, the first end of the second switch S2 and the first end of the second tuning capacitor PAC2 is an input terminal of the impedance tuning circuit. A second end of the first tuning capacitor PAC1 is connected to a first end of the first switch S1. A second end of the first switch S1 is connected to a second end of the second switch S2. A node arranged between and connected to the second end of the first switch S1 and the second end of the second switch S2 is an output terminal of the impedance tuning circuit. A second end of the second tuning capacitor PAC2 is grounded.

In one example, the impedance tuning circuit can be implemented through an adjustable chip, such as a chip of a type QM13011.

Figure 4:
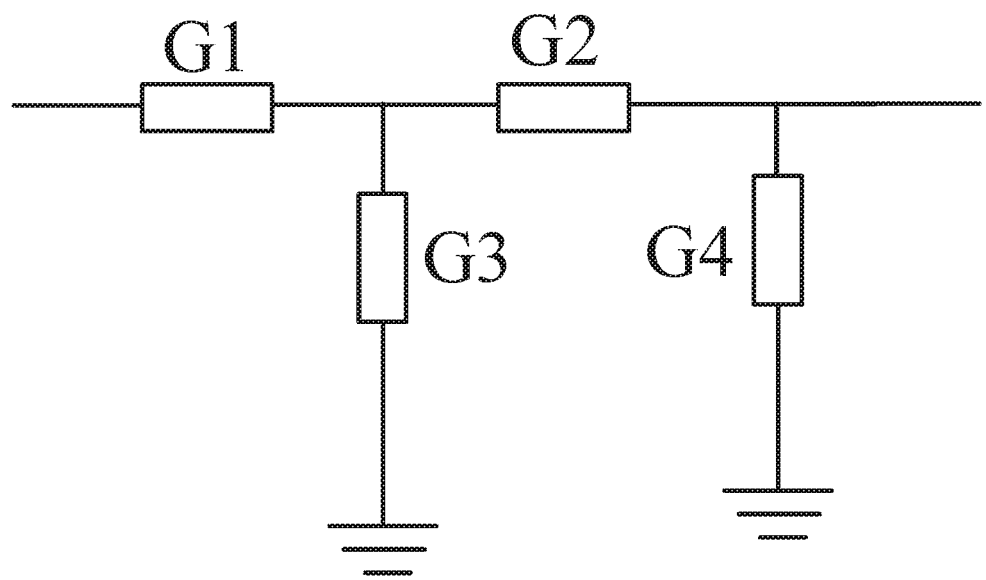
FIG. 4 is a circuit schematic diagram of a matching circuit of an antenna system according to a first embodiment.
Figure 5:
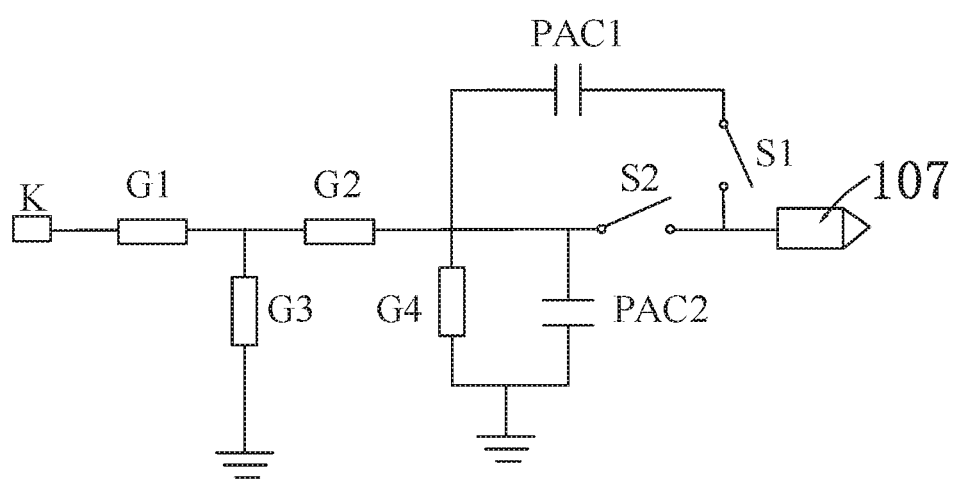
FIG. 5 is a schematic diagram showing connections between a feeding point, a matching circuit, an impedance tuning circuit, and a first frame-joint point of an antenna system according to a first embodiment.

In one example, the matching circuit is as shown in FIG. 4. The matching circuit includes a first impedance element G1, a second impedance element G2, a third impedance element G3, and a fourth impedance element G4. A first end of the first impedance element G1 is an input terminal of the matching circuit. A second end of the first impedance element G1, a first end of the second impedance element G2, and a first end of the third impedance element G3 are connected to each other. A second end of the second impedance element G2 is connected to a first end of the fourth impedance element G4. A second end of the third impedance element G3 and a second end of the fourth impedance element G4 are grounded. In this case, a schematic diagram showing connection between the feeding point, the matching circuit, the impedance tuning circuit and the first frame-joint point is shown in FIG. 5.

In one example, the first impedance element is a first resistor, and the second impedance element is a first inductor, the third impedance element is a second resistor, and the fourth impedance element is a second inductor.

In one example, the first resistor has a resistance of 0 ohm the first inductor has an inductance of 1.5 nH, the second resistor has a resistance of 0.2 ohms, and the second inductor has an inductance of 8 nH.

It should be noted that, in practical applications, those skilled in the art can understand that the resistance, the capacitance and the inductance of respective impedance elements in the matching circuit can be set according to a frequency band to be covered.

Figure 6:
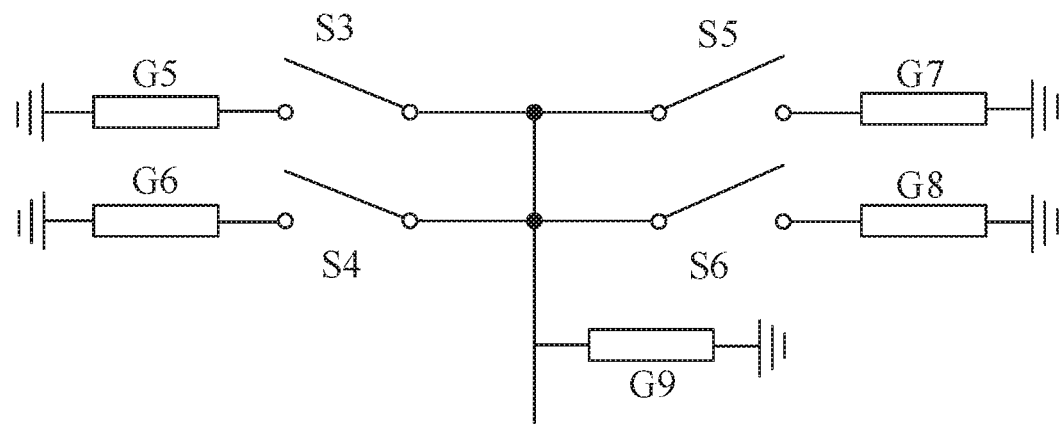
FIG. 6 is a circuit diagram of a switching circuit of an antenna system according to a first embodiment.

In one example, the switching circuit is as shown in FIG. 6, and it includes: a third switch S3, a fourth switch S4, a fifth switch S5, a sixth switch S6, a fifth impedance element G5, a sixth impedance element G6, a seventh impedance element G7, an eighth impedance element G8 and a ninth impedance element G9. A first end of the third switch S3 is grounded through the fifth impedance element G5, and a first end of the fourth switch S4 is grounded through the sixth impedance element G6. The fifth switch S5 is grounded through the seventh impedance element G7, and the sixth switch S6 is grounded through the eighth impedance element G8. A second end of the third switch S3, a second end of the fourth switch S4, a second end of the fifth switch S5, and a second end of the sixth switch S6 are connected to each other. A node connected to the second end of the third switch S3, the second end of the fourth switch S4, the second end of the fifth switch S5 and the second end of the sixth switch S6 is connected to the second frame-joint point 108 and is grounded through the ninth impedance element G9.

Figure 7:
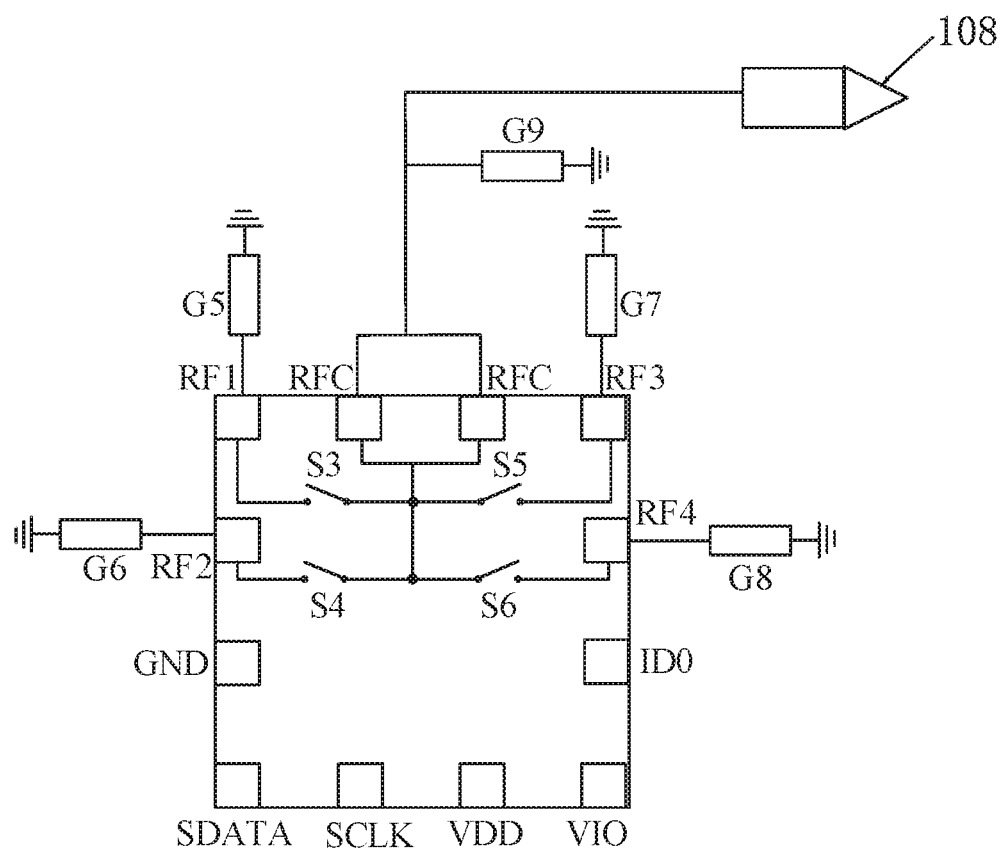
FIG. 7 is a schematic diagram showing a connection between a switching circuit and a second frame-joint point according to a first embodiment.

In one example, the switching circuit can be implemented by a switch control chip (such as a type of QM13126 chip, or a type of QM1313 chip). Taking the switching circuit being implemented through the QM13136 chip as an example, a schematic diagram of a connection between the switching circuit and the second frame-joint point is shown in FIG. 7. In FIG. 7, RF1 is a pin connected to the third switch S3, RF2 is a pin connected to the fourth switch S4, RF3 is a pin connected to the fifth switch S5, and RF4 is a pin connected to the switch S6. RFC is an output pin, GND is a ground pin, VDD is a power pin, SDATA is a data input terminal pin and SCLK is a system clock pin, VIO is a data input and output power pin, and ID0 is a data input terminal pin.

In one example, the fifth impedance element is a third inductor, and the sixth impedance element is a first capacitor, the seventh impedance element is a second capacitor, and the eighth impedance element is a fourth inductor.

In one example, an inductance of the third inductor is 10 nH, an inductance of the fourth inductor is 1.8 nH, the capacitance of the first capacitor is 10 pF, and a capacitance of the second capacitor is 2.7 pF.

It should be noted that those skilled in the art can understand that in practical applications, the impedances of the respective impedance elements in the switching circuit can be adjusted as needed, and the present embodiment does not have limitations thereon.

Figure 8:
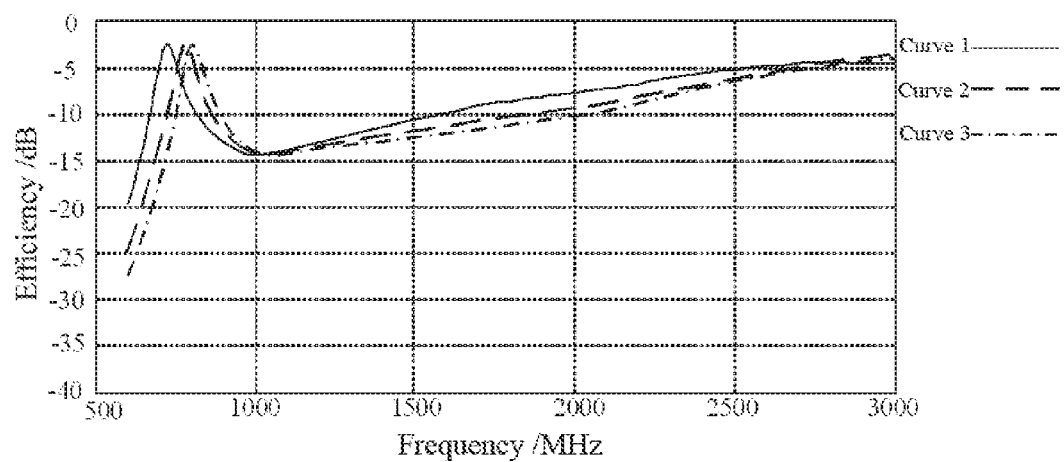
FIG. 8 illustrates an efficiency graph of an antenna system according to a first embodiment.
Figure 9:
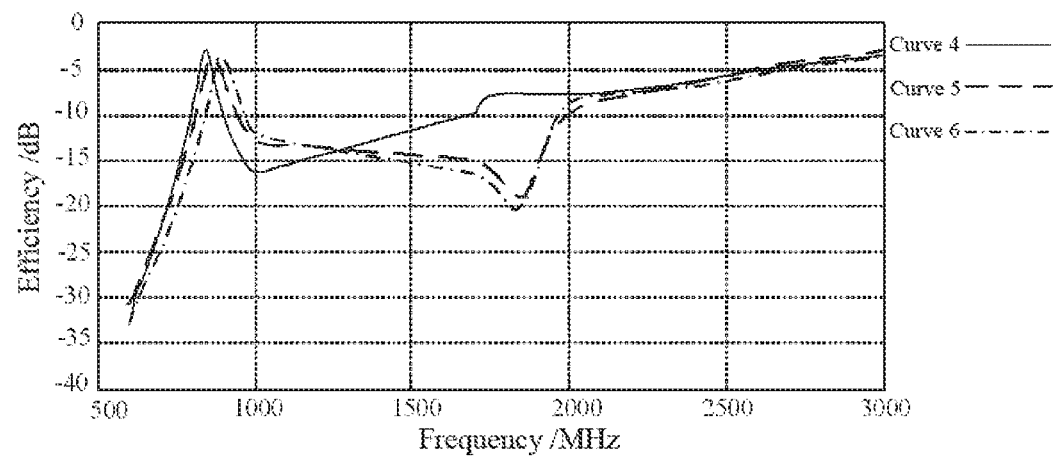
FIG. 9 illustrates an efficiency graph of an antenna system according to a first embodiment.
Figure 10:
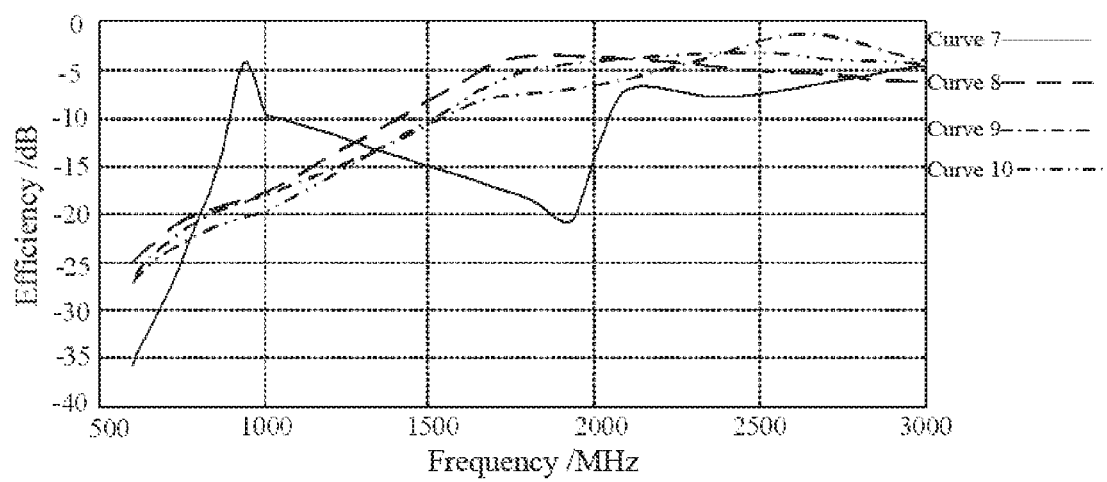
FIG. 10 illustrates an efficiency graph of an antenna system according to a first embodiment.

In one example, a schematic diagram of the connection between the feeding point, the matching circuit, the impedance tuning circuit, and the first frame-joint point is shown in FIG. 5. A schematic diagram of the connection between the switching circuit and the second frame-joint point is shown in FIG. 7. In this case, an antenna frequency band table is as shown in Table 1, and efficiency graphs of the antenna system in each frequency band are as shown in FIGS. 8 to 10. In Table 1, SW indicates a switching circuit, and NA indicates that it is not available, that is, after adjusting the PAC1, an operating frequency band of the antenna system will not be affected.

TABLE 1

| Frequency | SW | PAC1 (Pf) | PAC2 (Pf) | S1 | S2 |
|---|---|---|---|---|---|
| 905 MHz-960 MHz | turning on S3 and S4 | 0.65 | 0.4 | ON | OFF |
| 880 MHz-935 MHz | turning on S3 and S4 | 0.87 | 0.4 | ON | OFF |
| 839 MHz-894 MHz | turning on S3 and S4 | 1.1 | 0.4 | ON | OFF |
| 811 MHz-879 MHz | turning on S3 and S5 | 1.07 | 0.4 | ON | OFF |
| 791 MHz-842 MHz | turning off all switches | 0.87 | 0.4 | ON | OFF |
| 738 MHz-803 MHz | turning off all switches | 1.1 | 0.4 | ON | OFF |
| 703 MHz-768 MHz | turning off all switches | 1.32 | 0.4 | ON | OFF |
| 1710 MHz-2170 MHz | turning on S3 | NA | 0.4 | OFF | ON |
| 2300 MHz-2700 MHz | turning on S6 | NA | 2.08 | OFF | ON |
| 1710 MHz-2700 MHz | turning on S6 | NA | 0.64 | OFF | ON |

As can be seen from Table 1, when the first switch S1, the third switch S2, and the fourth switch S3 are switched on, the second switch S2, the fifth switch S5, and the sixth switch S6 are turned off, the capacitance of the first tuning capacitor PAC1 is 0.65 pF and the capacitance of the second tuning capacitor PAC2 is 0.4 pF, the operating frequency band of the antenna system covers a frequency band ranging from 905 MHz to 960 MHz. In this operating state, the efficiency of the antenna system is as shown by a curve 1 in FIG. 8. When the first switch S1, the third switch S3, and the fourth switch S4 are switched on, the second switch S2, the fifth switch S5, and the sixth switch S6 are turned off, the capacitance of the first tuning capacitor PAC1 is 0.87 pF and the capacitance of the second tuning capacitor PAC2 is 0.4 pF, the operating frequency band of the antenna system covers a frequency band ranging from 880 MHz to 935 MHz. In this operating state, the efficiency of the antenna system is as shown by a curve 2 in FIG. 8. When the first switch S1, the third switch S3, and the fourth switch S4 are switched on, the second switch S2, the fifth switch S5, and the sixth switch S6 are turned off, the capacitance of the first tuning capacitor PAC1 is 1.1 pF and the capacitance of the second tuning capacitor PAC2 is 0.4 pF, the operating frequency band of the antenna system covers a frequency band ranging from 839 MHz to 894 MHz. In this operating state, the efficiency of the antenna system is as shown by a curve 3 in FIG. 8. When the first switch S1, the third switch S3, and the fifth switch S5 are switched on, the second switch S2, the fourth switch S4, and the sixth switch S6 are turned off, the capacitance of the first tuning capacitor PAC1 is 1.07 pF and the capacitance of the second tuning capacitor PAC2 is 0.4 pF, the operating frequency band of the antenna system covers a frequency band ranging from 811 MHz to 879 MHz. In this operating state, the efficiency of the antenna system is as shown by a curve 4 in FIG. 9. When the first switch 1 is switched on, the second switch S2, the third switch S3, the fourth switch S4, the fifth switch S5, and the sixth switch S6 are turned off, the capacitance of the first tuning capacitor PAC1 is 0.87 pF and the capacitance of the second tuning capacitor PAC2 is 0.4 pF, the operating frequency band of the antenna system covers a frequency band ranging from 791 MHz to 842 MHz. In this operating state, the efficiency of the antenna system is as shown by a curve 5 in FIG. 9. When the first switch S1 is switched on, the second switch S2, the third switch S3, the fourth switch S4, the fifth switch S5, and the sixth switch S6 are turned off, the capacitance of the first tuning capacitor PAC1 is 1.1 pF and the capacitance of the second tuning capacitor PAC2 is 0.4 pF, the operating frequency band of the antenna system covers a frequency band ranging from 738 MHz to 803 MHz. In this operating state, the efficiency of the antenna system is as shown by a curve 6 in FIG. 9. When the first switch S1 is switched on, the second switch S2, the third switch S3, the fourth switch S4, the fifth switch S5, and the sixth switch S6 are turned off, the capacitance of the first tuning capacitor PAC1 is 32 pF and the capacitance of the second tuning capacitor PAC2 is 0.4 pF, the operating frequency band of the antenna system covers a frequency band ranging from 703 MHz to 768 MHz. In this operating state, the efficiency of the antenna system is as shown by a curve 7 in FIG. 10. When the second switch S2 and the third switch S3 are switched on, the first switch S1, the fourth switch S4, the fifth switch S5, and the sixth switch S6 are turned off, and the capacitance of the second tuning capacitor PAC2 is 0.4 pF, the operating frequency band of the antenna system covers a frequency band ranging from 1710 MHz to 2170 MHz. In this operating state, the efficiency of the antenna system is as shown by a curve 8 in FIG. 10. When the third switch S3 and the sixth switch S6 are switched on, the first switch S1, the second switch S2, the fourth switch S4, the fifth switch S5 are turned off and the capacitance of the second tuning capacitor PAC2 is 2.08 pF, the operating frequency band of the antenna system covers a frequency band ranging from 2300 MHz-to 2700 MHz. In this operating state, the efficiency of the antenna system is as shown by a curve 9 in FIG. 10. When the third switch S3 and the sixth switch 6 are switched on, the first switch S1, the second switch S2, the fourth switch S4, and the fifth switch S5 are turned off, and the capacitance of the second tuning capacitor PAC2 is 0.64 pF, the working band of the antenna system covers 1710 MHz-2700 MHz. In this operating state, the efficiency of the antenna system is as shown by a curve 10 in FIG. 10.

It can be seen from the above that in the antenna system, the operating frequency band of the antenna can be switched by adjusting the states of the switches in the switching circuit. By adjusting any one or any combination of the switching state of the first switch, the switching state of the second switch, the capacitance of the first tuning capacitor, and the capacitance of the second tuning capacitor, a circuit structure between the feeding point and the frame-joint point can be changed, so that under to premise of covering each frequency band between 1710 MHz and 2700 MHz, the antenna system takes into account of various carrier aggre-gation states between 1710 MHz and 2700 MHz, and achieve a good performance of each operating frequency band.

In addition, as can be seen from the above, when the mobile terminal works in a Frequency Division Duplexing (FDD) mode, that is, when the mobile terminal adopts two independent channels to respectively transmit information downwards and transmit information upwards, there is a guard frequency band between the two channels of the antenna system. The guard frequency band covers a previous operating frequency band or a latter operating frequency band by above 10 MHz, to ensure that the two channels can work simultaneously in the FDD mode.

In one example, in the direction along the first long-axis frame 103, a distance between the radio frequency front end area 106 and the first short-axis frame 102 is 1.5 mm, and in a direction along the first short-axis frame 102, the distance between the radio frequency front end area 106 and the first long-axis frame 103 is 1 mm, and a vertical distance between the front frame rib 1021 and the first long-axis frame 103 is 41.33 mm. A vertical distance between the slit 109 and the first short-axis frame 102 is 14 mm, and a width of the slit 109 is 1.8 mm.

It should be noted that the above is merely illustrative and does not limit the scope of the technical solutions of the present disclosure.

Compared with the related art, the antenna system provided in the embodiment, through a cooperating between the impedance matching circuit and the switching circuit, enables the antenna system to work in more frequency bands and can ensure the performance in each frequency band, so that the antenna system can satisfy that various carrier aggregation states between 1710 MHz and 2700 MHz can be covered.

A second embodiment of the present disclosure provides a mobile terminal, and the mobile terminal includes the antenna system provided in the first embodiment described above. The mobile terminal is suitable for an electronic device with a full screen.

Without doubt, the mobile terminal should also include hardware such as a processor and a memory. The memory and the processor are connected by a bus. The bus can include any number of interconnected buses and bridges. The bus connects various circuits of one or more processors and memories together. The bus can also connect various other circuits, such as peripherals, voltage stabilizer, and power management circuits, as is known in the art. Therefore, it will not be further described herein. A bus interface provides an interface between the bus and the antenna system. Data processed by the processor is transmitted over the wireless medium through the antenna system. The antenna system also receives the data and transmits the data to the processor. The processor is responsible for managing the bus and the usual processing, and it can also provide various functions including timing, peripheral interfaces, voltage regulation, power management, and other control functions. The memory can be used to store data used by the processor when performing operations.

What has been described above is only an embodiment of the present disclosure, and it should be noted herein that one ordinary person skilled in the art can make modifications without departing from the inventive concept of the present disclosure, but these are all within the scope of the present disclosure.

What is claimed is:

1. An antenna system, applied to a mobile terminal, the mobile terminal comprising a metal frame and a system ground received in the metal frame; the metal frame comprising a first short-axis frame, a first long-axis frame, a second short-axis frame and a second long-axis frame that are sequentially connected end to end; in a direction along the first long-axis frame, a distance between the system ground and the first short-axis frame being not larger than 1.5 mm; and in a direction along the first short-axis frame, a distance between the system ground and the first long-axis frame being not larger than 1 mm;
    wherein the antenna system comprises:
        a front frame rib connecting the system ground with the first short-axis frame;
        a slit provided on the first long-axis frame;
        a radio frequency front end area provided in the system ground; and
        a first frame-joint point and a second frame-joint point, each of which connects the radio frequency front end area with the metal frame, wherein the first frame-joint point and the second frame-joint point are located between the front frame rib and the slit, and the radio frequency front end area is provided with a feeding point, a matching circuit, an impedance tuning circuit, and a switching circuit, wherein the feeding point is electrically connected to the first frame-joint point through the matching circuit and the impedance tuning circuit that are connected in series; and the second frame-joint point is electrically connected to the system ground through the switching circuit,
    wherein the impedance tuning circuit and the switching circuit are adjusted to switch an operating state of the antenna system in such a manner that the antenna system operates in different frequency bands; and the antenna system comprises one operating state in which the antenna system operates in a frequency band ranging from 1710 MHz to 2700 MHz.

2. The antenna system as described in claim 1, wherein the impedance tuning circuit comprises a first switch, a second switch, a first tuning capacitor, and a second tuning capacitor,
    wherein a first end of the first tuning capacitor, a first end of the second switch, and a first end of the second tuning capacitor are connected to each other; a node connected to the first end of the first tuning capacitor, the first end of the second switch and the first end of the second tuning capacitor is an input terminal of the impedance tuning circuit; a second end of the first tuning capacitor is connected to a first end of the first switch; a second end of the first switch is connected to a second end of the second switch; a node connected to the second end of the first switch and the second end of the second switch is an output terminal of the impedance tuning circuit; and a second end of the second tuning capacitor is grounded.

3. The antenna system as described in claim 2, wherein the matching circuit comprises a first impedance element, a second impedance element, a third impedance element, and a fourth impedance element,
    wherein a first end of the first impedance element is an input terminal of the matching circuit; a second end of the first impedance element, a first end of the second impedance element, and a first end of the third impedance element are connected to each other, and a second end of the second impedance element is connected to a first end of the fourth impedance element; and both a second end of the third impedance element and a second end of the fourth impedance element are grounded.

4. The antenna system as described in claim 3, wherein the switching circuit comprises: a third switch, a fourth switch, a fifth switch, a sixth switch, a fifth impedance element, a sixth impedance element, a seventh impedance element, an eighth impedance element and a ninth impedance element,
    wherein a first end of the third switch is grounded through the fifth impedance element; a first end of the fourth switch is grounded through the sixth impedance element; the fifth switch is grounded through the seventh impedance element; the sixth switch is grounded through the eighth impedance element; a second end of the third switch, a second end of the fourth switch, a second end of the fifth switch, and a second end of the sixth switch are connected to each other; a node connected to the second end of the third switch, the second end of the fourth switch, the second end of the fifth switch and the second end of the sixth switch is connected to the second frame-joint point and is grounded through the ninth impedance element.

5. The antenna system as described in claim 4, wherein the first impedance element is a first resistor, the second impedance element is a first inductor, the third impedance element is a second resistor, the fourth impedance element is a second inductor, the fifth impedance element is a third inductor, the sixth impedance element is a first capacitor, the seventh impedance element is a second capacitor, and the eighth impedance element is a fourth inductor.

6. The antenna system as described in claim 5, wherein the third inductor has an inductance of 10 nH, the fourth inductor has an inductance of 1.8 nH, the first capacitor has a capacitance of 10 pF, and the second capacitor has a capacitance of 2.7 pF.

7. The antenna system as described in claim 6, wherein when the first switch, the third switch, and the fourth switch each are switched on, the second switch, the fifth switch, and the sixth switch each are switched off, a capacitance of the first tuning capacitor is 0.65 pF and a capacitance of the second tuning capacitor is 0.4 pF, an operating frequency band of the antenna system covers a frequency band ranging from 905 MHz to 960 MHz;
    when the first switch, the third switch, and the fourth switch each are switched on, the second switch, the fifth switch, and the sixth switch each are switched off, the capacitance of the first tuning capacitor is 0.87 pF and the capacitance of the second tuning capacitor is 0.4 pF, the operating frequency band of the antenna system covers a frequency band ranging from 880 MHz to 935 MHz;
    when the first switch, the third switch, and the fourth switch each are switched on, the second switch, the fifth switch, and the sixth switch each are switched off, the capacitance of the first tuning capacitor is 1.1 pF and the capacitance of the second tuning capacitor is 0.4 pF, the operating frequency band of the antenna system covers a frequency band ranging from 839 MHz to 894 MHz;
    when the first switch, the third switch, and the fifth switch each are switched on, the second switch, the fourth switch, and the sixth switch each are switched off, the capacitance of the first tuning capacitor is 1.07 pF and the capacitance of the second tuning capacitor is 0.4 pF, the operating frequency band of the antenna system covers a frequency band ranging from 811 MHz to 879 MHz;
    when the first switch is switched on, the second switch, the third switch, the fourth switch, the fifth switch, and the sixth switch each are switched off, the capacitance of the first tuning capacitor is 0.87 pF and the capacitance of the second tuning capacitor is 0.4 pF, the operating frequency band of the antenna system covers a frequency band ranging from 791 MHz to 842 MHz;

when the first switch is switched on, the second switch, the third switch, the fourth switch, the fifth switch, and the sixth switch each are switched off, the capacitance of the first tuning capacitor is 1.1 pF and the capacitance of the second tuning capacitor is 0.4 pF, the operating frequency band of the antenna system covers a frequency band ranging from 738 MHz to 803 MHz;

when the first switch is switched on, the second switch, the third switch, the fourth switch, the fifth switch, and the sixth switch each are switched off, the capacitance of the first tuning capacitor is 1.32 pF and the capacitance of the second tuning capacitor is 0.4 pF, the operating frequency band of the antenna system covers a frequency band ranging from 703 MHz to 768 MHz;

when the second switch and the third switch each are switched on, the first switch, the fourth switch, the fifth switch, and the sixth switch each are switched off, and the capacitance of the second tuning capacitor is 0.4 pF, the operating frequency band of the antenna system covers a frequency band ranging from 1710 MHz to 2170 MHz;

when the third switch and the sixth switch each are switched on, the first switch, the second switch, the fourth switch, the fifth switch each are switched off and the capacitance of the second tuning capacitor is 2.08 pF, the operating frequency band of the antenna system covers a frequency band ranging from 2300 MHz to 2700 MHz; and when the third switch and the sixth switch each are switched on, the first switch, the second switch, the fourth switch, and the fifth switch each are switched off, and the capacitance of the second tuning capacitor is 0.64 pF, the operating frequency band of the antenna system covers a frequency band ranging from 1710 MHz to 2700 MHz.

8. The antenna system as described in claim 1, wherein in the direction along the first long-axis frame, a distance between the radio frequency front end area and the first short-axis frame is 1.5 mm; and in a direction along the first short-axis frame, a distance between the radio frequency front end area and the first long-axis frame is 1 mm, and a vertical distance between the front frame rib and the first long-axis frame is 41.33 mm.

9. The antenna system as described in claim 1, wherein a vertical distance between the slit and the first short-axis frame is 14 mm, and a width of the slit is 1.8 mm.

10. A mobile terminal, comprising an antenna system, a metal frame and a system ground received in the metal frame, wherein the metal frame comprises a first short-axis frame, a first long-axis frame, a second short-axis frame and a second long-axis frame that are sequentially connected end to end; in a direction along the first long-axis frame, a distance between the system ground and the first short-axis frame being not larger than 1.5 mm; and a distance between the system ground and the first long-axis frame being not larger than 1 mm in the direction along the first short-axis frame;

wherein the antenna system comprises:
a front frame rib connecting the system ground with the first short-axis frame;
a slit provided on the first long-axis frame;
a radio frequency front end area provided in the system ground; and
a first frame-joint point and a second frame-joint point, each of which connects the radio frequency front end area with the metal frame, wherein the first frame-joint point and the second frame-joint point are located between the front frame rib and the slit, and the radio frequency front end area is provided with a feeding point, a matching circuit, an impedance tuning circuit, and a switching circuit, wherein the feeding point is electrically connected to the first frame-joint point through the matching circuit and the impedance tuning circuit that are connected in series; and the second frame-joint point is electrically connected to the system ground through the switching circuit, wherein the impedance tuning circuit and the switching circuit are adjusted to switch an operating state of the antenna system in such a manner that the antenna system operates in different frequency bands; and the antenna system comprises one operating state in which the antenna system operates in a frequency band ranging from 1710 MHz to 2700 MHz.

11. The mobile terminal as described in claim 10, wherein the impedance tuning circuit comprises a first switch, a second switch, a first tuning capacitor, and a second tuning capacitor, wherein a first end of the first tuning capacitor, a first end of the second switch, and a first end of the second tuning capacitor are connected to each other; a node connected to the first end of the first tuning capacitor, the first end of the second switch and the first end of the second tuning capacitor is an input terminal of the impedance tuning circuit; a second end of the first tuning capacitor is connected to a first end of the first switch; a second end of the first switch is connected to a second end of the second switch; a node connected to the second end of the first switch and the second end of the second switch is an output terminal of the impedance tuning circuit; and a second end of the second tuning capacitor is grounded.

12. The antenna system as described in claim 11, wherein the matching circuit comprises a first impedance element, a second impedance element, a third impedance element, and a fourth impedance element, wherein a first end of the first impedance element is an input terminal of the matching circuit; a second end of the first impedance element, a first end of the second impedance element, and a first end of the third impedance element are connected to each other, and a second end of the second impedance element is connected to a first end of the fourth impedance element; and both a second end of the third impedance element and a second end of the fourth impedance element are grounded.

13. The antenna system as described in claim 12, wherein the switching circuit comprises:
a third switch, a fourth switch, a fifth switch, a sixth switch, a fifth impedance element, a sixth impedance element, a seventh impedance element, an eighth impedance element and a ninth impedance element, wherein a first end of the third switch is grounded through the fifth impedance element; a first end of the fourth switch is grounded through the sixth impedance element; the fifth switch is grounded through the seventh impedance element; the sixth switch is grounded through the eighth impedance element; a second end of the third switch, a second end of the fourth switch, a second end of the fifth switch, and a second end of the sixth switch are connected to each other; a node connected to the second end of the third switch, the second end of the fourth switch, the second end of the fifth switch and the second end of the sixth switch is connected to the second frame-joint point and is grounded through the ninth impedance element.

14. The antenna system as described in claim 13, wherein the first impedance element is a first resistor, the second impedance element is a first inductor, the third impedance element is a second resistor, the fourth impedance element is a second inductor, the fifth impedance element is a third inductor, the sixth impedance element is a first capacitor, the seventh impedance element is a second capacitor, and the eighth impedance element is a fourth inductor.

15. The antenna system as described in claim 14, wherein the third inductor has an inductance of 10 nH, the fourth inductor has an inductance of 1.8 nH, the first capacitor has a capacitance of 10 pF, and the second capacitor has a capacitance of 2.7 pF.

16. The antenna system as described in claim 15, wherein when the first switch, the third switch, and the fourth switch each are switched on, the second switch, the fifth switch, and the sixth switch each are switched off, a capacitance of the first tuning capacitor is 0.65 pF and a capacitance of the second tuning capacitor is 0.4 pF, an operating frequency band of the antenna system covers a frequency band ranging from 905 MHz to 960 MHz;
   when the first switch, the third switch, and the fourth switch each are switched on, the second switch, the fifth switch, and the sixth switch each are switched off, the capacitance of the first tuning capacitor is 0.87 pF and the capacitance of the second tuning capacitor is 0.4 pF, the operating frequency band of the antenna system covers a frequency band ranging from 880 MHz to 935 MHz;
   when the first switch, the third switch, and the fourth switch each are switched on, the second switch, the fifth switch, and the sixth switch each are switched off, the capacitance of the first tuning capacitor is 1.1 pF and the capacitance of the second tuning capacitor is 0.4 pF, the operating frequency band of the antenna system covers a frequency band ranging from 839 MHz to 894 MHz;
   when the first switch, the third switch, and the fifth switch each are switched on, the second switch, the fourth switch, and the sixth switch each are switched off, the capacitance of the first tuning capacitor is 1.07 pF and the capacitance of the second tuning capacitor is 0.4 pF, the operating frequency band of the antenna system covers a frequency band ranging from 811 MHz to 879 MHz;
   when the first switch is switched on, the second switch, the third switch, the fourth switch, the fifth switch, and the sixth switch each are switched off, the capacitance of the first tuning capacitor is 0.87 pF and the capacitance of the second tuning capacitor is 0.4 pF, the operating frequency band of the antenna system covers a frequency band ranging from 791 MHz to 842 MHz;
   when the first switch is switched on, the second switch, the third switch, the fourth switch, the fifth switch, and the sixth switch each are switched off, the capacitance of the first tuning capacitor is 1.1 pF and the capacitance of the second tuning capacitor is 0.4 pF, the operating frequency band of the antenna system covers a frequency band ranging from 738 MHz to 803 MHz;
   when the first switch is switched on, the second switch, the third switch, the fourth switch, the fifth switch, and the sixth switch each are switched off, the capacitance of the first tuning capacitor is 1.32 pF and the capacitance of the second tuning capacitor is 0.4 pF, the operating frequency band of the antenna system covers a frequency band ranging from 703 MHz to 768 MHz;
   when the second switch and the third switch each are switched on, the first switch, the fourth switch, the fifth switch, and the sixth switch each are switched off, and the capacitance of the second tuning capacitor is 0.4 pF, the operating frequency band of the antenna system covers a frequency band ranging from 1710 MHz to 2170 MHz;
   when the third switch and the sixth switch each are switched on, the first switch, the second switch, the fourth switch, the fifth switch each are switched off and the capacitance of the second tuning capacitor is 2.08 pF, the operating frequency band of the antenna system covers a frequency band ranging from 2300 MHz to 2700 MHz; and
   when the third switch and the sixth switch each are switched on, the first switch, the second switch, the fourth switch, and the fifth switch each are switched off, and the capacitance of the second tuning capacitor is 0.64 pF, the operating frequency band of the antenna system covers a frequency band ranging from 1710 MHz to 2700 MHz.

17. The antenna system as described in claim 10, wherein in the direction along the first long-axis frame, a distance between the radio frequency front end area and the first short-axis frame is 1.5 mm; and in a direction along the first short-axis frame, a distance between the radio frequency front end area and the first long-axis frame is 1 mm, and a vertical distance between the front frame rib and the first long-axis frame is 41.33 mm.

18. The antenna system as described in claim 10, wherein a vertical distance between the slit and the first short-axis frame is 14 mm, and a width of the slit is 1.8 mm.

* * * * *